(12) United States Patent
Heubel et al.

(10) Patent No.: US 9,513,704 B2
(45) Date of Patent: Dec. 6, 2016

(54) HAPTICALLY ENABLED USER INTERFACE

(75) Inventors: Robert W. Heubel, San Leandro, CA (US); Jason D. Fleming, San Jose, CA (US); Erin B. Ramsay, Montreal (CA); A. Timothy Vetter, Los Gatos, CA (US); Robert A. Lacroix, Saint-Lambert (CA); Pedro Gregorio, Verdun (CA); Danny A. Grant, Laval (CA); Lauri Olli Matias Impivaara, Helsinki (FI)

(73) Assignee: Immersion Corporation, San Jose, CA (US)

( * ) Notice: Subject to any disclaimer, the term of this patent is extended or adjusted under 35 U.S.C. 154(b) by 1728 days.

(21) Appl. No.: 12/046,934

(22) Filed: Mar. 12, 2008

(65) Prior Publication Data

US 2009/0231271 A1    Sep. 17, 2009

(51) Int. Cl.
*G06F 3/01*    (2006.01)
*G06F 3/0485*    (2013.01)

(52) U.S. Cl.
CPC ............ *G06F 3/016* (2013.01); *G06F 3/0485* (2013.01); *G06F 2203/014* (2013.01)

(58) Field of Classification Search
CPC ... G06F 3/016; G06F 3/0485; G06F 2203/014
USPC ............... 345/156–173; 715/780, 816, 702
See application file for complete search history.

(56) References Cited

U.S. PATENT DOCUMENTS

| | | | |
|---|---|---|---|
| 5,956,016 A * | 9/1999 | Kuenzner et al. | 345/156 |
| 6,307,549 B1 * | 10/2001 | King et al. | 715/810 |
| 6,337,678 B1 | 1/2002 | Fish | |
| 6,771,250 B1 * | 8/2004 | Oh | 345/156 |
| 6,819,312 B2 | 11/2004 | Fish | |
| 7,412,223 B1 * | 8/2008 | Yamamoto et al. | 455/403 |
| 7,788,032 B2 * | 8/2010 | Moloney | 701/472 |
| 7,979,809 B2 * | 7/2011 | Sunday | 715/863 |
| 2002/0109668 A1 * | 8/2002 | Rosenberg et al. | 345/156 |
| 2003/0122779 A1 * | 7/2003 | Martin et al. | 345/156 |
| 2005/0017947 A1 | 1/2005 | Shahoian | |
| 2005/0250575 A1 * | 11/2005 | Kane et al. | 463/17 |
| 2006/0026535 A1 * | 2/2006 | Hotelling et al. | 715/863 |
| 2006/0026536 A1 | 2/2006 | Hotelling et al. | |
| 2006/0061545 A1 * | 3/2006 | Hughes et al. | 345/156 |
| 2006/0119586 A1 * | 6/2006 | Grant et al. | 345/173 |
| 2006/0197752 A1 | 9/2006 | Hurst et al. | |

(Continued)

FOREIGN PATENT DOCUMENTS

| | | |
|---|---|---|
| EP | 0 805 389 A2 | 11/1997 |
| JP | H11-203045 | 7/1999 |

(Continued)

OTHER PUBLICATIONS

Buxton, Multi-Touch Systems that I Have Known and Loved, http://www.billbuxton.com/multitouchOverview.html.

(Continued)

*Primary Examiner* — Sahlu Okebato
(74) *Attorney, Agent, or Firm* — Kilpatrick Townsend & Stockton LLP

(57) ABSTRACT

A device has a user interface that generates a haptic effect in response to user inputs or gestures. In one embodiment, the device receives an indication that the user is scrolling through a list of elements and an indication that an element is selected. The device determines the scroll rate and generates a haptic effect that has a magnitude that is based on the scroll rate.

10 Claims, 4 Drawing Sheets

(56) References Cited

U.S. PATENT DOCUMENTS

| | | | | |
|---|---|---|---|---|
| 2007/0119698 A1* | 5/2007 | Day | .............................. | 200/510 |
| 2007/0150830 A1* | 6/2007 | Ording et al. | ................ | 715/784 |
| 2007/0150842 A1* | 6/2007 | Chaudhri et al. | ............. | 715/863 |
| 2007/0290999 A1* | 12/2007 | Cho et al. | ..................... | 345/158 |
| 2008/0036743 A1* | 2/2008 | Westerman et al. | .......... | 345/173 |
| 2008/0106523 A1* | 5/2008 | Conrad | ......................... | 345/173 |
| 2008/0168384 A1* | 7/2008 | Platzer et al. | ................ | 715/784 |
| 2008/0270931 A1* | 10/2008 | Bamford | ....................... | 715/777 |
| 2009/0073194 A1* | 3/2009 | Ording | .......................... | 345/672 |

FOREIGN PATENT DOCUMENTS

| | | |
|---|---|---|
| JP | 2002-149312 | 5/2002 |
| JP | 2004-362428 A | 12/2004 |
| JP | 2006-040271 | 2/2006 |
| JP | 2006-079238 | 3/2006 |
| JP | 2006-331210 | 12/2006 |
| JP | 2008-033739 | 2/2008 |
| KR | 10-2004-0062559 | 7/2004 |
| KR | 10-2006-0134119 | 12/2006 |
| KR | 10-2007-0041998 | 4/2007 |
| KR | 10-2007-0061272 | 6/2007 |
| WO | WO 2006/042309 A1 | 4/2006 |

OTHER PUBLICATIONS

Chang et al., ComTouch: Design of a Vibrotactile Communication Device, DIS2002, London Copyright 2002 ACM, 10 pages.
International Search Report and Written Opinion—PCT/US2009/034231.
Japanese Patent Office, Decision of Refusal, Application No. 2014-119190 dated Jun. 6, 2016.
European Patent Office, Extended European Search Report, Application No. 13154785 dated Apr. 24, 2013.
European Patent Office, Communication pursuant to Article 94(3) EPC, Application No. 13154785 dated Feb. 2, 2016.
Japanese Patent Office, Notification of Reasons for Refusal, Application No. 2014-119190 dated Sep. 1, 2015.
Korean Patent Office, Notice of Final Rejection, Application No. 10-2010-7022816 dated Sep. 18, 2015.
Korean Patent Office, Notice of Preliminary Rejection, Application No. 10-2010-7022816 dated Dec. 10, 2015.
European Patent Office, Communication Pursuant to Article 94(3) EPC, Application No. 12192210 dated May 18, 2015.
European Patent Office, Extended European Search Report, Application No. 12192210 dated Feb. 22, 2013.
European Patent Office, Decision to Refuse a European Patent Application, Application No. 09720237 dated Dec. 10, 2012.
European Patent Office, Communication Pursuant to Article 94(3) EPC, Application No. 09720237 dated Oct. 27, 2011.
State Intellectual Property Office of the People's Republic of China, Reexamination Decision, Application No. 200980116028 dated Aug. 28, 2015.
State Intellectual Property Office of the People's Republic of China, Notification of Reexamination, Application No. 200980116028 dated Feb. 16, 2015.
State Intellectual Property Office of the People's Republic of China, Rejection Decision, Application No. 200980116028 dated Dec. 30, 2013.
State Intellectual Property Office of the People's Republic of China, Notification of Second Office Action, Application No. 200980116028 dated Jun. 6, 20103.
State Intellectual Property Office of the People's Republic of China, Notification of First Office Action, Application No. 200980116028 dated Sep. 29, 2012.
Korean Patent Office, Notice of Preliminary Rejection, Application No. 10-2015-7030145 dated Jan. 4, 2016.
European Patent Office, Communication Pursuant to Article 94(3) EPC, Application No. 12192210 Feb. 29, 2016.
Notice of Preliminary Rejection as issued in Korean Patent Application No. KR 10-2010-7022816, dated Mar. 16, 2015.
Korean Patent Office, KIPO Notice of Preliminary Rejection, Application No. 10-2016-7015485 dated Sep. 2, 2016.

\* cited by examiner

HAPTICALLY ENABLED USER INTERFACE

FIELD OF THE INVENTION

One embodiment of the present invention is directed to haptic effects. More particularly, one embodiment of the present invention is directed to a user interface having haptic effects.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, such as cellular telephones, personal digital assistants (PDAs), portable gaming devices, and a variety of other portable electronic devices. For example, some portable gaming applications are capable of vibrating in a manner similar to control devices (e.g., joysticks, etc.) used with larger-scale gaming systems that are configured to provide haptic feedback. Additionally, devices such as cellular telephones and PDAs are capable of providing various alerts to users by way of vibrations. For example, a cellular telephone can alert a user to an incoming telephone call by vibrating. Similarly, a PDA can alert a user to a scheduled calendar item or provide a user with a reminder for a "to do" list item or calendar appointment.

Increasingly, portable devices are moving away from physical buttons in favor of touchscreen-only interfaces. This shift allows increased flexibility, reduced parts count, and reduced dependence on failure-prone mechanical buttons and is in line with emerging trends in product design. Many of these touchscreen devices include sophisticated user interfaces that convert user gestures, including multi-touch gestures, into input commands.

SUMMARY OF THE INVENTION

One embodiment is a device having a user interface that generates a haptic effect in response to user inputs or gestures. In one embodiment, the device receives an indication that the user is scrolling through a list of elements and an indication that an element is selected. The device determines the scroll rate and generates a haptic effect that has a magnitude that is based on the scroll rate.

DETAILED DESCRIPTION

One embodiment is a haptically enabled user interface that provides haptic confirmation to a user in response to various user inputs and gestures or device activity.

Figure 1:
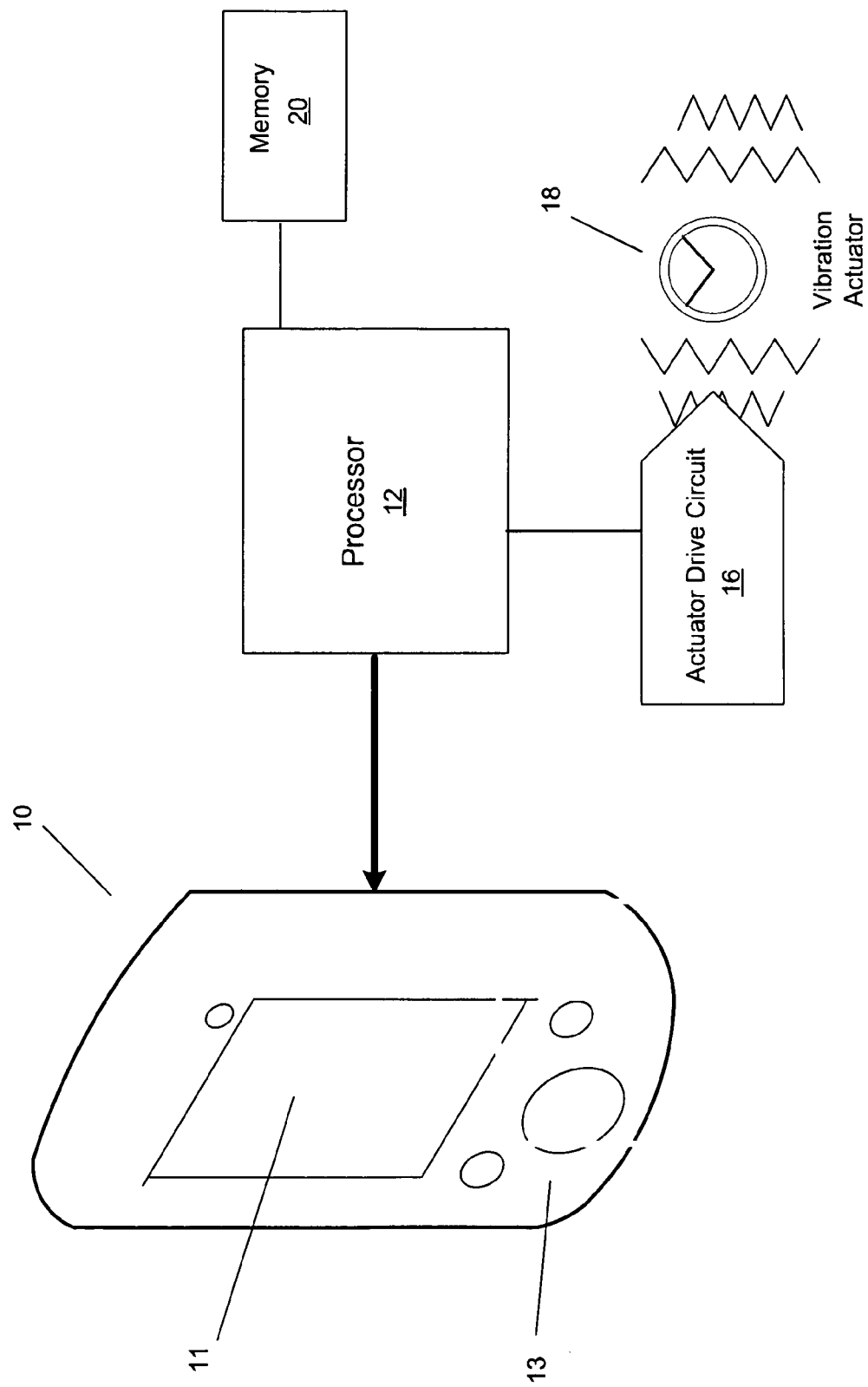
FIG. 1 is a block diagram of a cellular telephone in accordance with one embodiment.

FIG. 1 is a block diagram of a cellular telephone 10 in accordance with one embodiment. Telephone 10 includes a touchscreen 11 and may include mechanical keys/buttons 13. Internal to telephone 10 is a haptic feedback system that generates vibrations on telephone 10. In one embodiment, the vibrations are generated on the entire telephone 10. In other embodiments, specific portions of telephone 10 can be haptically enabled by the haptic feedback system, including the entire touchscreen 11 or individual portions of touchscreen 11.

The haptic feedback system includes a processor 12. Coupled to processor 12 is a memory 20 and an actuator drive circuit 16, which is coupled to a vibration actuator 18. Processor 12 may be any type of general purpose processor, or could be a processor specifically designed to provide haptic effects, such as an application-specific integrated circuit ("ASIC"). Processor 12 may be the same processor that operates the entire telephone 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to drive circuit 16 which includes electronic components and circuitry used to supply actuator 18 with the required electrical current and voltage to cause the desired haptic effects. Actuator 18 is a haptic device that generates a vibration on telephone 10. Actuator 18 can include one or more force applying mechanisms which are capable of applying a vibrotactile force to a user of telephone 10 (e.g., via the housing of telephone 10). Actuator 18 may be, for example, an electromagnetic actuator, an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Memory device 20 can be any type of storage device or computer-readable medium, such as random access memory ("RAM") or read-only memory ("ROM"). Memory 20 stores instructions executed by processor 12. Memory 20 may also be located internal to processor 12, or any combination of internal and external memory.

Touchscreen 11 recognizes touches, and may also recognize the position and magnitude of touches on a touch sensitive surface. The data corresponding to the touches is sent to processor 12, or another processor within telephone 10, and processor 12 interprets the touches and in response generates haptic effects. Touchscreen 11 may sense touches using any sensing technology, including capacitive sensing, resistive sensing, surface acoustic wave sensing, pressure sensing, optical sensing, etc. Touchscreen 11 may sense multi-touch contacts and may be capable of distinguishing multiple touches that occur at the same time. Touchscreen 11 may further display images for the user to interact with, such as keys, dials, etc., or may be a touchpad with minimal or no images.

Although the embodiment of FIG. 1 is a cellular telephone 10, other embodiments may be any type of device that provides a user interface and is capable of generating haptic effects. The device may be handheld and may include a touchscreen that generates the user interface. In other embodiments, rather than generating haptic effects on a handheld device for touchscreen interactions, the device may be a computer system that includes a display and a cursor control device such as a mouse, touchpad, mini-joystick, etc. The display displays the user interface and the mouse or other device includes vibration actuator 18 so that the haptic effect is generated on the device as it is held by the user.

Figure 2:
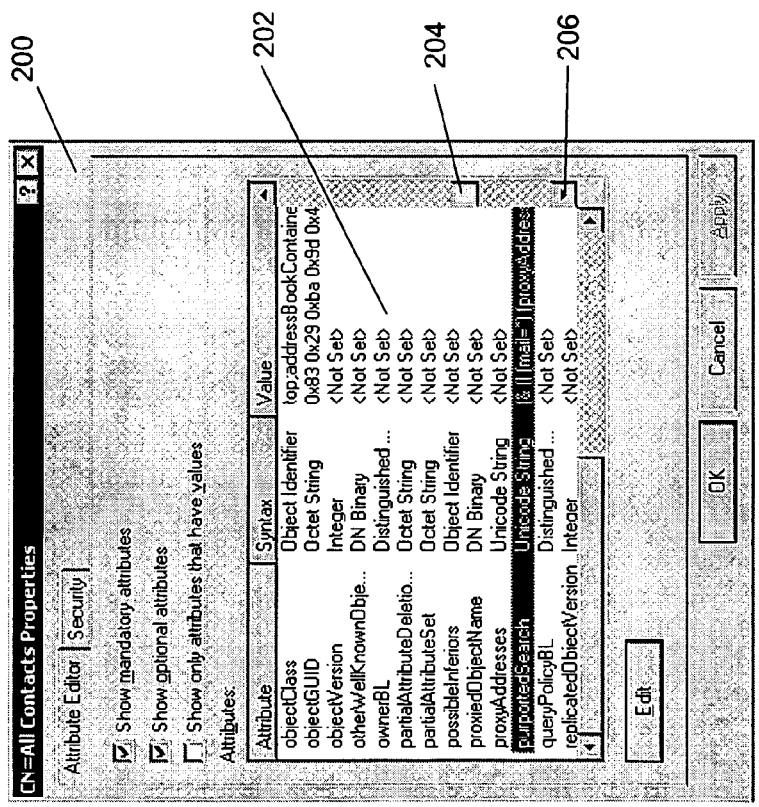
FIG. 2 is a block diagram of a user interface that includes a list of elements that can be scrolled through the interaction of a scroll bar in accordance with one embodiment.

FIG. 2 is a block diagram of a user interface ("UI") 200 that includes a list of elements 202 that can be scrolled through the interaction of a scroll bar 204 in accordance with one embodiment. A user can slide scroll bar 204 through interaction with a touchscreen, or by pressing a button or using a mouse or other interface device. Further, arrows 206 can be selected in a known manner to scroll the list of elements 202.

When elements 202 are being scrolled, one of the elements is highlighted to indicate which element is "selected". In one embodiment, a haptic effect is generated when each element of elements 202 is selected. The haptic effect may be in the form of a "bump" "pop", "click", "tick", etc. through a predetermined combination of magnitude, frequency and duration. However, as the scroll rate is increased, a constant magnitude haptic effect can feel like a constant "buzz" to the user and fail to provide meaningful information. Therefore, in one embodiment, the haptic effect volume/magnitude is decreased as the scroll rate increases, and vice versa. This keeps the overall "haptic energy" of the UI interaction at a low and unobtrusive level.

Figure 3:
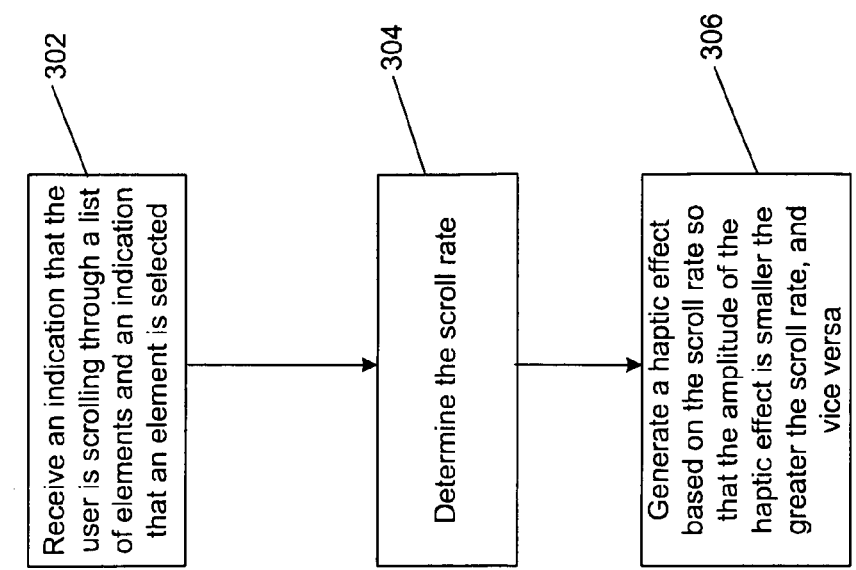
FIG. 3 is a flow diagram of the functionality performed by the telephone of FIG. 1 in accordance with one embodiment in response to a scrolling of elements through a user interface.

FIG. 3 is a flow diagram of the functionality performed by telephone 10 of FIG. 1 in accordance with one embodiment in response to a scrolling of elements 202 through a user interface. In one embodiment, the functionality of FIG. 3, and FIGS. 4 and 6 below, is implemented by software stored in memory and executed by a processor. In other embodiments, the functionality can be performed by hardware, or any combination of hardware and software.

At 302, an indication that the user is scrolling through the list of elements 202 and one of the elements has been highlighted or selected is received. In one embodiment, the list of elements 202 can be a literal list such as a menu list or list of contacts as in FIG. 2, or it could be an abstract list such as a 3D cylinder clock with a list of scrolling digital numbers that can be changed by scroll/flick tumbling of numbers. The scrolling may be accomplished by interacting with the screen through a touchscreen, by button press/hold events in up/down, left/right, diagonal or circular motion, or by any other method.

At 304, the current scroll rate of elements 202 is determined and may be compared to a previous scroll rate. It is determined if the current scroll rate is increasing or decreasing.

At 306, a haptic effect that corresponds to the selection of one of the elements is generated based on the current scroll rate and whether it is increasing or decreasing or based on the magnitude of the scroll rate. In one embodiment, the haptic effect has a short duration and repeats whenever a new element is selected. The magnitude of the haptic effect is decreased relative to a previous haptic effect if the scroll rate is increasing. Similarly, the magnitude of the haptic effect is increased relative to a previous haptic effect if the scroll rate is decreasing. In another embodiment, the magnitude of the haptic effect is determined from a lookup table that bases the magnitude inversely on the current scroll rate. The greater the scroll rate, the smaller the magnitude, and vice versa.

In one embodiment, when a user is scrolling the list of elements 202, eventually the user will reach the end of the list. At the point, the scrolling may stop or the list may wrap around to the beginning of the list. In one embodiment, a haptic effect will be generated when the last item in the list is selected or when the list wraps around so that a user receives a non-visual indication. This haptic effect is different than the haptic effect that is generated when one of the items is selected that is not at the end of the list, as disclosed above. In one embodiment, the end-of-list haptic effect differs via a change in any combination of duration, amplitude, frequency, etc.

In another embodiment, a list of items or other objects, such a photos, a ball, puck, etc. can be "flicked" using a gesture so that the list visually moves. The speed of the movement can be dependent on the speed of the flick. Upon hitting a virtual stop, like an end-of-list, wall or other "hard object," the flicked object reacts visually with a bounce. In one embodiment, the bounce causes a corresponding haptic effect and optionally an audible output. In one embodiment, the haptic effect would have characteristic parameters of being initially very strong (i.e., high magnitude) with a rapidly decreasing magnitude as the bounced object comes to rest. Further, another haptic effect may be generated, such as a subtle haptic click, pop, or tick effect to confirm that the flicked object has stopped moving and come to rest.

Figure 4:
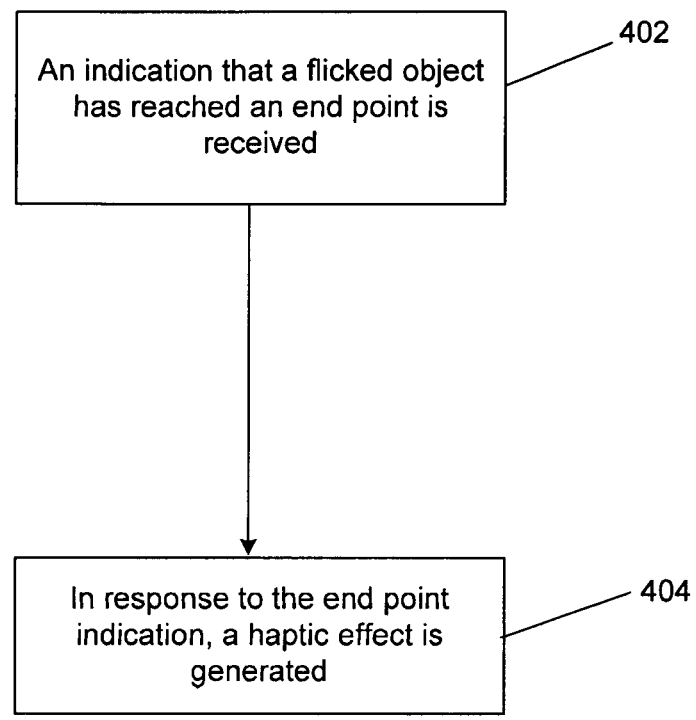
FIG. 4 is a flow diagram of the functionality performed by the telephone of FIG. 1 in accordance with one embodiment in response to a flicked object.

FIG. 4 is a flow diagram of the functionality performed by telephone 10 of FIG. 1 in accordance with one embodiment in response to a flicked object. At 402, processor 12 receives an indication that a flicked object has reached an end point, such as a wall, end-of-list, etc. At 404, in response to the end point indication, a haptic effect is generated. In one embodiment, the haptic effect is dynamic in that it initially has a high magnitude, and then has a rapidly decreasing magnitude as the flicked object comes to rest.

Figure 5:
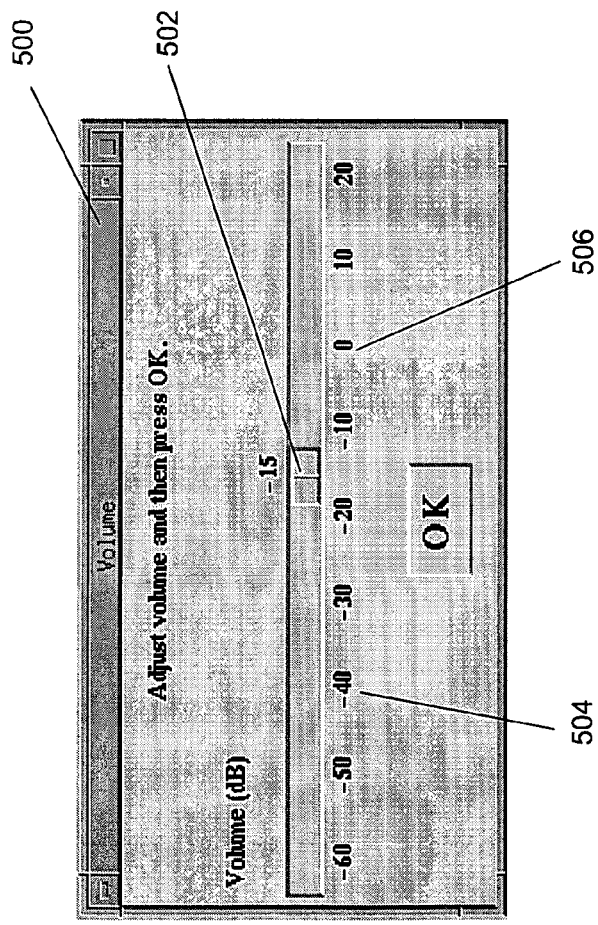
FIG. 5 is a user interface for a touchscreen that provides a virtual slider for controlling volume.

In another embodiment, a user interface simulates a slider. There are a number of physical control sliders found in professional audio and industrial control equipment. These sliders are generally controlled by dragging the slider with a fingertip. Many of the slider control functionality can be built into touchscreen UIs. FIG. 5 is a UI 500 for a touchscreen that provides a virtual slider 502 for controlling volume. UI 500 provides information about the position or state of virtual slider 502 and the parameter it is controlling. Slider 502 may be manipulated by a finger or a cursor. Other UIs may provide a slider that is laid out in a up/down orientation or might be rotational such as a knob or wheel.

UI 500 has a minimum and maximum setting, and in one embodiment a dynamic haptic effect is generated that has an increasing magnitude as the volume is increased and a decreasing magnitude as the volume is decreased. This type of haptic effect helps communicate the relative volume of the parameter being increased/decreased, whether it is an audible volume from a stereo system or a physical volume such as for an industrial flow control system managing liquid volumes. In addition, positional haptic effects may be generated that simulate bumps or dents that might be used as slider end-stops, a centering location, or other important positional locations in the slider that might be specific to the end-user application being controlled (e.g., positions 504 and 506).

Figure 6:
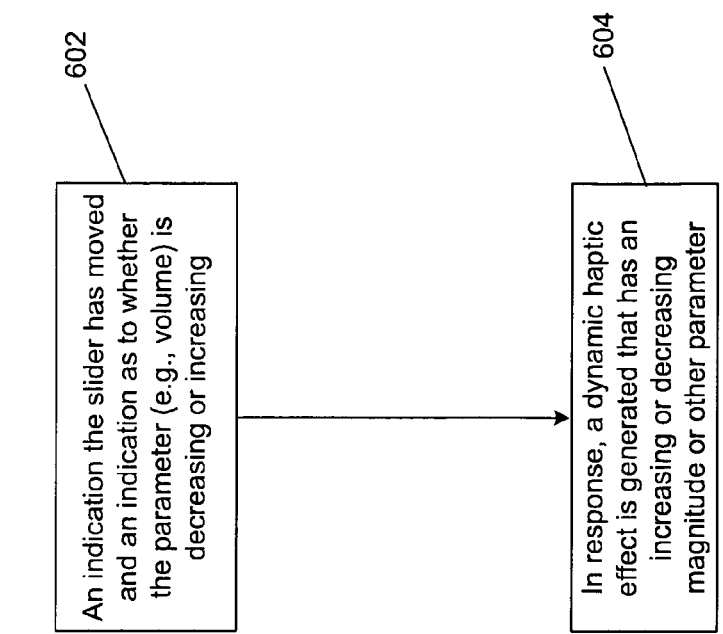
FIG. 6 is a flow diagram of the functionality performed by the telephone of FIG. 1 in accordance with one embodiment in response to the movement of a slider.

FIG. 6 is a flow diagram of the functionality performed by telephone 10 of FIG. 1 in accordance with one embodiment in response to the movement of a slider. At 602, processor 12 receives an indication the slider has moved and an indication as to whether the parameter (e.g., volume) is decreasing or increasing. At 604, in response to the parameter increasing or decreasing, a dynamic haptic effect is generated that has an increasing or decreasing magnitude or other parameter.

In another embodiment, slider 502 is a toggle type slider that has only two resting positions or a limited number of positions, such as an on/off switch. In this embodiment, the haptic effect is generated to confirm the action of the toggled control. Further, two or more distinctly different haptic effects can communicate to the user into which state the slider has been placed, such as on/off, slow/medium/fast, etc. The differences in the haptic effect may be a varied magnitude, frequency, duration or any combination of these three parameters.

In another embodiment, telephone 10 generates haptic effects during screen transitions. The haptic effects in one embodiment are synchronized with any visual transitions occurring on screen. Examples of screen transitions that may generate haptic effects include changes in screen orientation where the on-screen content rotates, content being replace with new content through screen fades, wipes, dissolves or other video transition techniques, changes in viewing size such as zooming in or out, panning of content such as web pages, pictures or documents, etc. In one embodiment, the haptic effect will be generated during the screen transition, and a different haptic effect can be generated when the screen transition is completed In another embodiment, haptic effects are generated when a user drags selected text or other items across a touchscreen. A haptic bump, pop or tick may be generated during the drag. This haptic effect could be played over each letter selected and a different, possibly stronger, effect could be played as whole words are selected in order to confirm both individual letter and whole word selections. Further, a haptic effect may be generated as each individual object becomes selected during the dragging. Further, while dragging an object or otherwise moving a finger across a touchscreen, a haptic effect can be generated to simulate the "surface" of the screen. For example, if the screen is displaying a bumpy road, the haptic effects can be generated so that it feels as if the finger is dragging across a bumpy road.

In another embodiment, a haptic effect such as a bump, pop or tick could be generated as a user click-drags his finger or cursor across multiple objects like words, files, directories, pictures, icons, etc. In one embodiment, the haptic effect would be generated as each individual object became selected or deselected from the grouping while dragging. This selection method could be accomplished with both single and multi-touch touchscreens.

In another embodiment, a haptic effect such as a bump, pop or tick could be added as a user double-taps his finger or double-clicks a cursor to select words. This confirmation method could be used when triple-tapping or triple-clicking to select whole sentences or paragraphs.

In some embodiments, a user is forced to wait while a device such as telephone 10 initializes, downloads content, etc. During this time the UI generally cannot be interacted with and any time spent attempting to interact is wasted. In one embodiment, a haptic effect is generated to inform the user that the device has entered or has exited a loading/standby state that causes the user to wait.

In one embodiment, the haptic effect while the UI is unresponsive is a subtle, constant effect having a non-changing magnitude or frequency that simply ends when the UI becomes available again for interactions. In another embodiment, the haptic effect is a dynamic effect that increases in magnitude and/or frequency as the system progresses towards completion of its task. Further, in one embodiment a separate confirming completion haptic effect can be generated, such as a bump, pop or tick when the UI becomes available again.

In another embodiment, a gesture from a user on touchscreen 11 can be used to unlock content that has previously been locked by device 10. Device 10 can be unlocked when a predetermined gesture is input by the user. For example, the gesture can function as a password or pass code to unlock the menu system of device 10. Examples of a predetermined gesture includes a swirl, swipe, press/tap pattern, or any combination of these gestures.

In one embodiment, a haptic effect is generated that corresponds to or is a representation of the gesture so the user may confirm the gesture or learn the gesture. The haptic effect can be dynamic and may be applied to individual portions of touchscreen 11 at a time in order to simulate directional motion such as a circular motion. This especially has value when the gesture is a substitute for a pass code and the user needs to memorize the gesture in order to access device 10. Without the haptic effect, gestures such as a swipe, swirl or tap pattern may be reviewed/confirmed by replaying the gesture with visual and/or audio representations of the gesture. However, the haptic effect can aid the user in remembering the gesture pass code better than with only visual and/or audible cues, especially with a gesture that may include finger pressure data patterns generated by touchscreen 11. The haptic effect can "simulate" the finger pressure data by changing the amplitude values of the haptic effect. The haptic effect may also be generated for a user who may have forgotten their gesture pass code—the playing of the haptic effect will serve as a reminder.

In another embodiment, the user gesture is used as a "hot key" or macro to bypass a number of steps to arrive at a desired menu or function. For example, swirling a user's finger clockwise on touchscreen 11 twice might indicate that the user wants to call home, or type a SMS mobile message. Device 10 would then bypass the standard menu selections that would otherwise be needed to be navigated and simply initiate the task immediately. As above, a haptic effect is generated to confirm the gesture to the user or allow the user to review the gesture.

As disclosed, a device having a user interface generates various haptic effects in order to provide feedback to a user input or provide information regarding a state of the device. The haptic effects enhance the usability of the device.

Several embodiments are specifically illustrated and/or described herein. However, it will be appreciated that modifications and variations are covered by the above teachings and within the purview of the appended claims without departing from the spirit and intended scope of the invention.

What is claimed is:

1. A method of operating a user interface comprising:
receiving an indication that an object has been flicked by a user gesture and that the object has reached an end point that causes the object to bounce;
generating a haptic effect when the object has reached the end point, wherein the haptic effect decreases in magnitude as the bounced object comes to rest; and
generating a second haptic effect to confirm that the bounced object has come to rest.

2. A method of operating a device having a touchscreen comprising:
storing a gesture on the device, wherein the gesture comprises a user interaction associated with a directional motion on the touchscreen; and
generating a dynamic haptic effect that simulates the gesture, wherein the dynamic haptic effect is applied to different individual portions of the touchscreen in series to simulate the directional motion.

3. The method of claim 2, wherein generating the dynamic haptic effect comprises generating a haptic effect that changes amplitude to simulate a varied pressure portion of the gesture, wherein the varied pressure portion includes a varied finger pressure data pattern associated with the gesture.

4. The method of claim 2, the method further comprising unlocking the device based on the gesture.

5. The method of claim 2, the method further comprising initiating a task based on the gesture.

6. The method of claim 1, the method further comprising determining a speed of the flick, wherein a speed of the object is determined based on the speed of the flick.

7. The method of claim 2, wherein the gesture comprises at least one of a swirl pattern, a swipe pattern, or a tap pattern.

8. The method of claim 2, wherein the directional motion of the gesture comprises a circular motion.

9. The method of claim 2, wherein generating the dynamic haptic effect comprises:
generating a first haptic effect at a first portion of the touchscreen at a first time; and
generating a second haptic effect at a second portion of the touchscreen at a second time, wherein the second haptic effect is different from the first haptic effect, the first portion is different from the second portion, and the first time is different from the second time.

10. The method of claim 2, the method further comprising:
receiving an input on the touchscreen;
comparing the input on the touchscreen to the stored gesture; and
generating the dynamic haptic effect to confirm that the input matches the stored gesture.

* * * * *

UNITED STATES PATENT AND TRADEMARK OFFICE
CERTIFICATE OF CORRECTION

PATENT NO. : 9,513,704 B2  Page 1 of 1
APPLICATION NO. : 12/046934
DATED : December 6, 2016
INVENTOR(S) : Heubel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1812 days.

Signed and Sealed this
Twenty-fifth Day of September, 2018

Andrei Iancu
*Director of the United States Patent and Trademark Office*